US008611838B2

(12) United States Patent
Kanayama

(10) Patent No.: US 8,611,838 B2
(45) Date of Patent: Dec. 17, 2013

(54) HD RADIO RECEIVER AND AUTOSTORE CONTROL METHOD

(75) Inventor: Yozo Kanayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 58 days.

(21) Appl. No.: 13/382,480

(22) PCT Filed: May 28, 2010

(86) PCT No.: PCT/JP2010/003605
§ 371 (c)(1),
(2), (4) Date: Jan. 5, 2012

(87) PCT Pub. No.: WO2010/143372
PCT Pub. Date: Dec. 16, 2010

(65) Prior Publication Data
US 2012/0155525 A1 Jun. 21, 2012

(30) Foreign Application Priority Data
Jun. 11, 2009 (JP) ................................ 2009-140147

(51) Int. Cl.
*H04B 1/18* (2006.01)

(52) U.S. Cl.
USPC ...... 455/186.1; 455/3.01; 455/3.02; 455/130; 455/134; 455/135

(58) Field of Classification Search
USPC ............ 455/3.01, 3.02, 130, 134, 135, 150.1, 455/168.1, 179.1, 185.1, 186.1
See application file for complete search history.

(56) References Cited

U.S. PATENT DOCUMENTS

2005/0073614 A1* 4/2005 Yukiyoshi .................... 348/732

FOREIGN PATENT DOCUMENTS

JP 7-264497 A 10/1995
JP 2000-138910 A 5/2000
JP 2000-332578 A 11/2000
JP 2005-130058 A 5/2005

* cited by examiner

*Primary Examiner* — Tuan Pham
(74) *Attorney, Agent, or Firm* — Birch, Stewart, Kolasch & Birch, LLP

(57) ABSTRACT

An HD radio receiver includes a storage unit for carrying out tuning at a time when autostore is activated and for storing broadcasting station data about a terrestrial digital radio broadcast received by the tuning, a reception quality detecting unit for detecting reception quality of the radio broadcast received, and a control unit for deciding the number of broadcast programs of multicasting that broadcasts a plurality of programs on a single frequency from the terrestrial digital radio broadcast received and for registering in the storage unit broadcasting station data with a greater number of decided broadcast programs in preference to broadcasting station data with better reception quality detected by the reception quality detecting unit.

3 Claims, 4 Drawing Sheets

FIG.3

| Frequency [MHz] | Received Field Strength [dBuV] | Digital or Analog | Number of Programs of Multicasting | Order of Storage According to Conventional Method | Order of Storage According to New Method |
|---|---|---|---|---|---|
| 87.7 | 61 | A | 0 | 6 | - |
| 90.3 | 52 | A | 0 | 9 | - |
| 91.5 | 72 | D | 2 | 4 | 4 |
| 92.7 | 75 | A | 0 | 3 | - |
| 93.1 | 51 | D | 3 | - | 1 |
| 96.3 | 43 | D | 3 | - | 2 |
| 95.1 | 37 | D | 2 | - | 5 |
| 97.1 | 41 | D | 3 | - | 3 |
| 98.1 | 29 | A | 0 | - | - |
| 98.9 | 38 | A | 0 | - | - |
| 99.3 | 77 | A | 0 | 2 | 10 |
| 99.7 | 81 | A | 0 | 1 | 9 |
| 100.1 | 38 | D | 1 | - | 6 |
| 101.3 | 45 | D | 1 | - | 7 |
| 102.7 | 31 | A | 0 | - | - |
| 103.5 | 49 | D | 1 | 10 | 8 |
| 104.1 | 69 | A | 0 | 5 | - |
| 105.3 | 55 | A | 0 | 8 | - |
| 106.9 | 27 | A | 0 | - | - |
| 107.5 | 59 | A | 0 | 7 | - |

FIG.4

| Frequency [MHz] | Received Field Strength [dBuV] | Digital or Analog | Number of Programs of Multicasting | Order of Storage According to Conventional Method | Order of Storage According to New Method |
|---|---|---|---|---|---|
| 87.7 | 61 | D | 2 | 6 | 7 |
| 90.3 | 52 | D | 1 | 9 | - |
| 91.5 | 72 | D | 2 | 4 | 6 |
| 92.7 | 75 | D | 1 | 3 | - |
| 93.1 | 51 | D | 3 | - | 1 |
| 96.3 | 43 | D | 3 | - | 3 |
| 95.1 | 37 | D | 2 | - | 10 |
| 97.1 | 41 | D | 3 | - | 4 |
| 98.1 | 29 | D | 2 | - | - |
| 98.9 | 38 | D | 3 | - | 5 |
| 99.3 | 77 | D | 1 | 2 | - |
| 99.7 | 81 | D | 1 | 1 | - |
| 100.1 | 38 | D | 2 | - | 9 |
| 101.3 | 45 | D | 3 | - | 2 |
| 102.7 | 31 | D | 2 | - | - |
| 103.5 | 49 | D | 1 | 10 | - |
| 104.1 | 69 | D | 1 | 5 | - |
| 105.3 | 55 | D | 1 | 8 | - |
| 106.9 | 27 | D | 2 | - | - |
| 107.5 | 59 | D | 2 | 7 | 8 |

HD RADIO RECEIVER AND AUTOSTORE CONTROL METHOD

TECHNICAL FIELD

The present invention relates to an HD radio (Hybrid Digital Radio) receiver and an autostore control method for receiving hybrid terrestrial digital radio broadcasting that transmits an analog broadcast and a digital signal simultaneously using an existing AM/FM analog broadcasting frequency.

BACKGROUND ART

Recently, terrestrial digital radio broadcasting has spread which uses a frequency of an existing AM/FM analog broadcast, and transmits an analog broadcast and a digital signal simultaneously.

In North America, about 1700 or more broadcasting stations have already started or are preparing IBOC (In-Band On Channel) hybrid broadcasting.

Being different from the terrestrial digital radio broadcasting of Japan, since the hybrid broadcasting can utilize the same frequency as that of the existing analog broadcasting, it is not necessary for a broadcasting station to prepare a new frequency for digital broadcasting. Accordingly, a conventional analog radio receiver can receive existing broadcasts, and an HD radio receiver compatible with digital reception can receive a digital radio broadcast. When receiving the digital signal, the HD radio receiver can achieve tone quality equivalent to FM broadcasting as to AM broadcasting, and tone quality equivalent to CD (Compact Disc) as to FM broadcasting.

The HD radio receiver is often provided with a function of successively searching for broadcasting stations with good receiving conditions within a receivable frequency band, and of storing them in a preset memory (referred to as an autostore function from now on). According to the autostore function, it can store broadcasting station data in a preset memory in order of reception quality, and provide a user with the broadcasting station data stored in the preset memory, thereby being able to provide convenience of tuning.

According to the autostore function described above, however, since the receivable broadcasting station data are stored in the order of reception quality, and the HD radio receiver stores data on many analog broadcasting stations, it cannot achieve its original functions sufficiently.

For this reason, a preset method of a receiving set has been conventionally known which detects receiving frequencies of the digital broadcasts and analog broadcasts successively, and registers broadcasting stations relating to the digital broadcasting preferentially (see Patent Document 1, for example).

PRIOR ART DOCUMENT

Patent Document

Patent Document 1: Japanese Patent Laid-Open No. 2005-130058.

DISCLOSURE OF THE INVENTION

According to the technique disclosed in the foregoing Patent Document 1, since the digital broadcasting is set preferentially, chances of achieving tone quality equivalent to CDs increase, thereby enabling the HD radio receiver to exhibit its original functions to some extent.

By the way, as one of the functions of the HD radio, there is a function called multicasting that broadcasts a plurality of broadcast programs on a single frequency. At present, FM digital broadcasting enables a user to listen to or view up to a maximum of three programs (broadcasting programs) on a single frequency. According to the HD radio standards, since the multicasting function enables broadcasting up to a maximum of eight programs, it is likely that the number of the programs will increase in the future. Thus, a user will be able to listen to or view more programs by making effective use of the limited frequencies by the function.

In contrast with this, according to the technique disclosed in the foregoing Patent Document 1, a problem can arise in that even if the digital broadcasting is preset preferentially, many broadcasting station data with a smaller number of multicasting programs will be stored.

The present invention is implemented to solve the foregoing problem. Therefore it is an object of the present invention to provide an HD radio receiver and an autostore control method capable of enabling an HD radio receiver to fulfill its original functions by presetting broadcasting station data in descending order of the number of programs of multicasting, thereby being able to provide a user with convenience.

To solve the foregoing problem, an HD radio receiver in accordance with the present invention is an HD radio receiver that uses an existing analog broadcast frequency and receives a hybrid terrestrial digital radio broadcast which transmits a digital signal simultaneously with an analog broadcast, and that includes: a storage unit for carrying out tuning at a time when autostore is activated, and for storing broadcasting station data about a terrestrial digital radio broadcast received by the tuning; a reception quality detecting unit for detecting reception quality of the radio broadcast received; and a control unit for deciding a number of broadcast programs of multicasting that broadcasts a plurality of programs on a single frequency from the terrestrial digital radio broadcast received, and for registering in the storage unit broadcasting station data with a greater number of decided broadcast programs in preference to broadcasting station data with better reception quality detected by the reception quality detecting unit.

In addition, an autostore control method of an HD radio receiver in accordance with the present invention is an autostore control method in an HD radio receiver that includes at least an operation unit, a control unit, and a storage unit, that monitors reception quality under control of the control unit, that has an autostore function of automatically registers receivable broadcasting station data in the storage unit by carrying out tuning, and that receives a hybrid terrestrial digital radio broadcast which transmits a digital signal simultaneously with an analog broadcast using an existing analog broadcast frequency, and that includes: a step of carrying out tuning while the control unit alters the receiving frequency successively at a time when autostore is activated through the operation unit; a step of registering, when a radio broadcast received at each tuning has prescribed reception quality, the reception quality in the storage unit by the control unit; a step of making, when the control unit makes a decision as to whether the radio broadcast received by the tuning includes a digital broadcast and when the digital broadcast is included, a further decision of a number of broadcast programs of multicasting that broadcasts a plurality of programs on a single frequency; and a step of registering in the storage unit the broadcasting station data with a greater number of broadcast programs decided by the control unit in preference to the broadcasting station data with better reception quality.

According to the present invention, it can offer the HD radio receiver and autostore control method capable of fulfilling the original function of the HD radio receiver and providing a user with convenience by presetting the broadcasting station data in descending order of the number of programs of multicasting.

BRIEF DESCRIPTION OF THE DRAWINGS

FIG. 3 is a table showing the operation of the HD radio receiver of the embodiment 1 in accordance with the present invention as an <example 1> in comparison with a conventional example; and FIG. 4 is a table showing the operation of the HD radio receiver of the embodiment 1 in accordance with the present invention as an <example 2> in comparison with the conventional example.

EMBODIMENT FOR CARRYING OUT THE INVENTION

An embodiment for carrying out the invention will now be described with reference to the accompanying drawings to explain the present invention in more detail.

Embodiment 1

Figure 1:
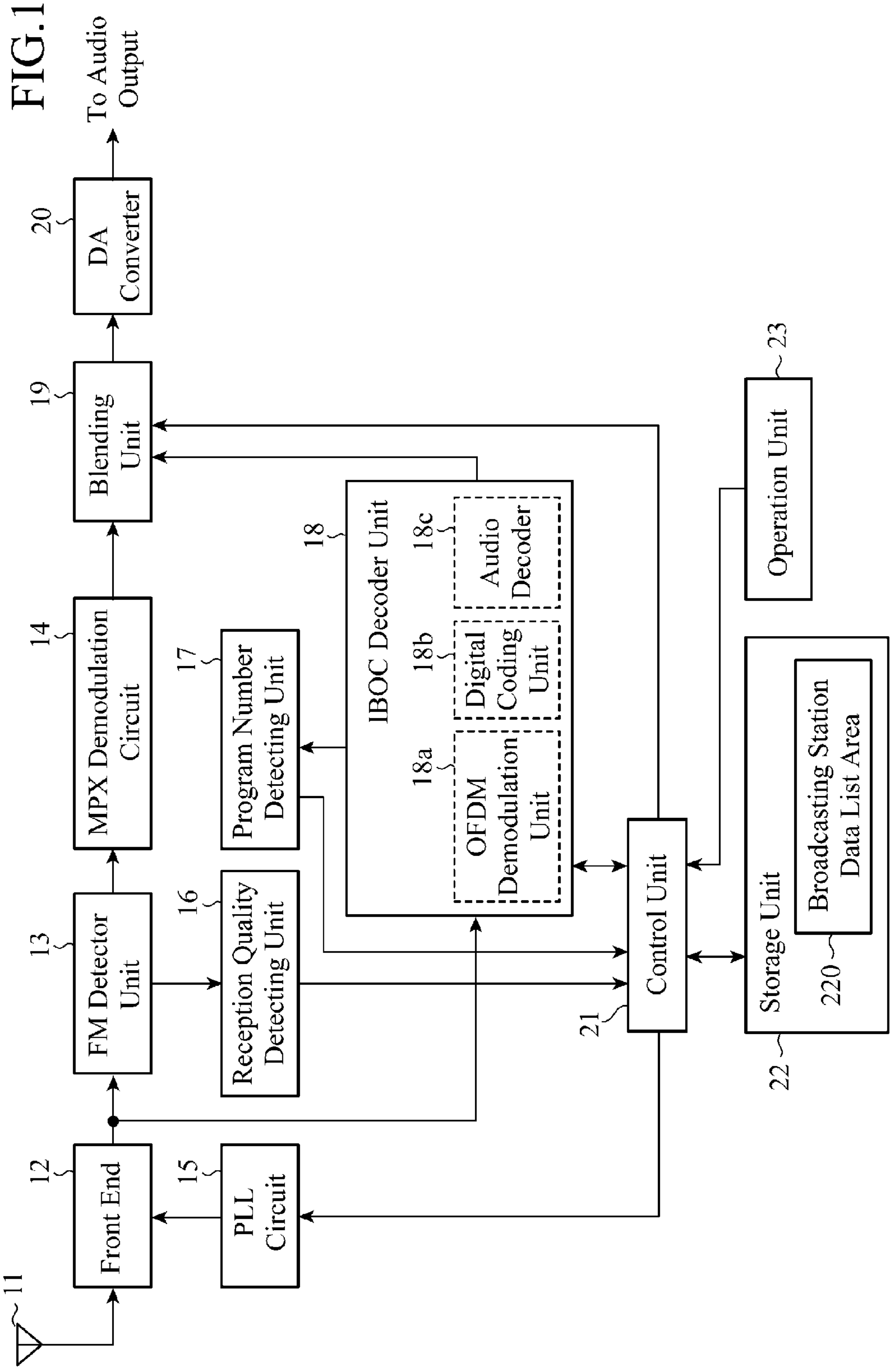
FIG. 1 is a block diagram showing a configuration of an HD radio receiver of an embodiment 1 in accordance with the present invention.

FIG. 1 is a block diagram showing a configuration of an HD radio receiver 10 of an embodiment 1 in accordance with the present invention.

As shown in FIG. 1, the HD radio receiver 10 of the embodiment 1 in accordance with the present invention comprises an antenna 11, a front end 12, an FM detector unit 13, a multiplexer demodulation circuit 14 (referred to as an MPX demodulation circuit 14 from now on), a PLL (Phase Locked Loop) circuit 15, a reception quality detecting unit 16, a program number detecting unit 17, an IBOC decoder unit 18, a blending unit 19, a DA converter 20 (abbreviated to DAC 20 from now on), a control unit 21, a storage unit 22, and an operation unit 23.

In FIG. 1, the front end 12 selects a desired station from HD radio broadcast waves received with an antenna 11, and converts it to an IF (intermediate frequency) signal. In addition, as for the frequency signal converted to the IF signal by the front end 12, an internal AD converter in the front end 12 converts it to a digital signal, and supplies it to the FM detector unit 13 and IBOC decoder unit 18.

The front end 12 is controlled by the PLL circuit 15 including a programmable frequency divider, and tuning is carried out by setting a dividing ratio of the PLL circuit 15 by the control unit 21.

The detection output of the FM detector unit 13 is supplied to the MPX demodulation circuit 14 that separates it to L (left) and R (right) channel signals in the case of a stereo broadcast.

The IBOC decoder unit 18 performs the IBOC demodulation as described before. The IBOC decoder unit 18 includes an OFDM demodulation unit 18*a* for carrying out OFDM (Orthogonal Frequency Division Multiplexing) demodulation of the received signal, a digital coding unit 18*b*, and an audio decoder 18*c* for performing demodulation and decoding of voice compression and the like. The voice data decoded and generated by the IBOC decoder unit 18 is supplied to the blending unit 19.

The blending unit 19 blends received voice (referred to as analog received voice from now on) of the analog broadcast wave of the MPX demodulation circuit 14 with received voice (referred to as digital received voice from now on) of the digital broadcast wave of the IBOC decoder unit 18, and supplies to the DAC 20. The voice signal converted from the digital signal to an analog signal by the DAC 20 is supplied to an audio output reproduction system not shown.

The control unit 21, which comprises a microcomputer with a built-in memory, for example, can capture information such as received electric field strength and noise level fed from the reception quality detecting unit 16 and the number of programs (the number of broadcast programs) of the multicasting detected by the program number detecting unit 17 by causing the microcomputer to sequentially read and execute programs stored in the memory.

Incidentally, the reception quality detecting unit 16 detects information such as received electric field strength (RSSI) and a noise level from the signal detected by the FM detector unit 13, and the program number detecting unit 17 detects the number of programs (the number of broadcast programs) of the multicasting from the signal output from the IBOC decoder unit 18 (OFDM demodulation unit 18*a*).

Detecting a start of the autostore by user manipulation of the operation unit 23 (autostore button), the control unit 21 controls the PLL circuit 15 in such a manner as to successively alter the receiving frequency for tuning, and registers broadcasting station data about a frequency selected as a receivable broadcasting station and the broadcasting station name and the like in a broadcasting station data list area 220 in the storage unit 22.

Figure 2:
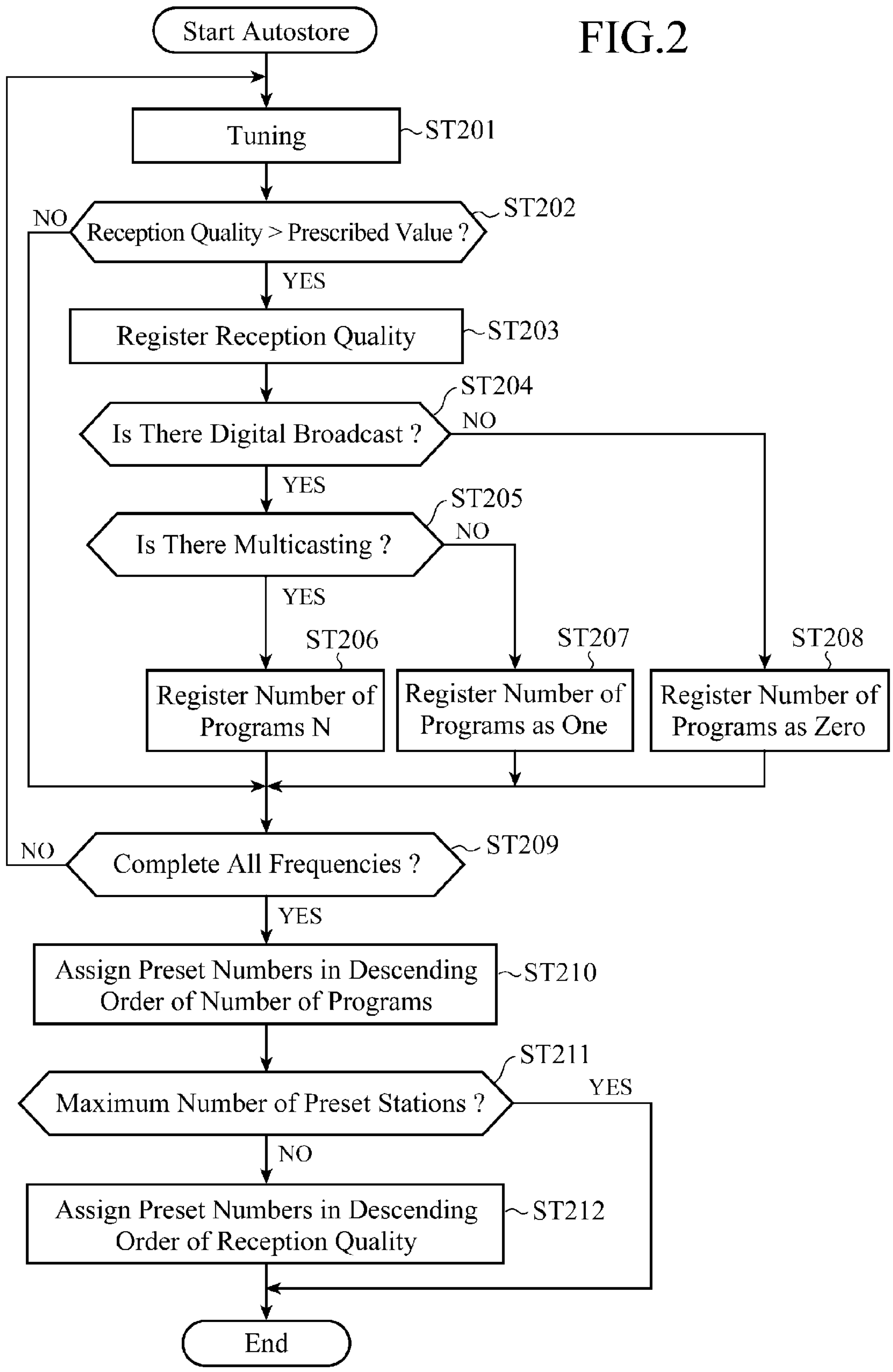
FIG. 2 is a flowchart showing the operation of the HD radio receiver of the embodiment 1 in accordance with the present invention.

FIG. 2 is a flowchart showing the operation of the HD radio receiver of the embodiment 1 in accordance with the present invention 10, and more particularly a processing procedure of the control unit 21 shown in FIG. 1.

Referring to the flowchart of FIG. 2, the operation of the HD radio receiver 10 of the embodiment 1 in accordance with the present invention shown in FIG. 1 will be described in detail.

First, taking the opportunity of detecting the user manipulation of the operation unit 23 (depression of the autostore button), the control unit 21 starts tuning to a radio broadcast according to a tuning candidate frequency while altering the dividing ratio of the PLL circuit 15 (step ST201). The control unit 21 monitors the reception quality of the radio broadcast using the reception quality detecting unit 16 every time the tuning is made (step ST202), and registers, when the received electric field strength (RSSI: Received Signal Strength Indication) is not less than a prescribed value ("YES" at step ST202), the RSSI value in the broadcasting station data list area 220 of the storage unit 22 (step ST203). In contrast, when it is less than the prescribed value, the control unit 21 jumps to all frequency completion deciding processing at step ST209, followed by the tuning to a radio broadcast according to the next tuning candidate frequency at step ST201.

Subsequently, the control unit 21 makes a decision as to whether the received radio broadcast includes a digital broadcast or not (step ST204). In the case of only an analog broadcast ("NO" at step ST204), the control unit 21 stores zero in the D field of the relevant frequency in the broadcasting station data list area 220 of the storage unit 22 as the number of multicasting programs (step ST208).

On the other hand, when the received radio broadcast includes a digital broadcast ("YES" at step ST204), the control unit 21, referring to the output of the program number detecting unit 17, makes a further decision as to the presence or absence of multicasting that broadcasts a plurality of programs on a single frequency (step ST205). If it makes a decision that there are a plurality of programs broadcast by the multicasting ("YES" at step ST205), the control unit 21 registers the number of programs N in the field of the relevant frequency in the broadcasting station list area 220 assigned to a prescribed area of the storage unit 22 (step ST206). Unless it makes a decision that there are programs broadcast by the multicasting ("NO" at step ST205), the control unit 21 registers one as the number of programs of the multicasting (step ST207). The operations at the foregoing steps ST201-ST208 are repeatedly executed until the end of tuning in to all the candidate frequencies.

After the tuning in to all the candidate frequencies is completed ("YES" at step ST209), the control unit 21 sorts the candidates in descending order of the number of programs of multicasting with reference to the broadcasting station data list area 220 of the storage unit 22, and assigns a preset number to each of them (step ST210). Incidentally, as for the candidates with the same number of programs of the multicasting, the preset numbers are assigned to them in descending order of the received electric field strength detected by the reception quality detecting unit 16. In contrast, if the multicasting decision processing at step ST205 makes a decision that there is no broadcast based on the multicasting ("NO" at step ST205), the broadcasting station data to be registered in the list in the storage unit 22 (broadcasting station list area 220) is determined in accordance with the received electric field strength monitored continuously by the reception quality detecting unit 16.

Next, referring to the broadcasting station list 220 stored in the prescribed area in the storage unit 22, the control unit 21 makes a decision as to whether the number of the broadcasting stations registered in the broadcasting station data list area 220 of the storage unit 22 equals the maximum number of preset stations available to a user as a result of the autostore (step ST211). Here, a decision is made as to whether the number of the broadcasting stations is equal to the maximum number of preset stations "10" or not, for example. If a decision is made that it equals the maximum number of preset stations ("YES" at step ST211), the control unit 21 completes the series of the foregoing autostore operation, otherwise ("No" at step ST211), it assigns preset numbers to the remaining broadcasting station data list area 220 in descending order of the received electric field strength monitored by the reception quality detecting unit 16 (step ST212).

FIG. 3 and FIG. 4 are tables showing the operation of the HD radio receiver 10 of the embodiment 1 in accordance with the present invention in comparison with a conventional example.

Both <Example 1> shown in FIG. 3 and <Example 2> shown in FIG. 4 show for each broadcasting station data in each entry the frequency [MHz], received electric field strength (RSSI [dBuV]), distinction between digital/analog broadcast, the number of multicasting programs, conventional storing order, and storing order by the present embodiment 1.

As described above, the IBOC system transmits a digital signal simultaneously with an analog broadcast by using a frequency of an existing analog broadcast. Thus, both the analog broadcast and digital broadcast are mixed in the receivable frequency band.

Accordingly, when there are many analog broadcasting stations with high received electric field strength, the conventional autostore method has a problem in that although it stores, in the broadcasting station data list area 220, many broadcasting station data about the analog broadcasting stations, it stores only a small number of the broadcasting station data about the digital broadcast stations, thereby being unable to fully achieve the original function of the HD radio receiver. This is shown in FIG. 3 as an example of the broadcasting station data registered in the broadcasting station data list area 220 of the storage unit 22. In addition, even if the receivable broadcasting stations are all digital broadcast stations, since the conventional example makes a decision based on the reception quality monitored, there are some cases where many broadcasting stations with a smaller number of multicasting programs are stored. This is shown in FIG. 4 as an example of the broadcasting station data set in the broadcasting station data list area 220 of the storage unit 22.

Against such problems, according to the HD radio receiver 10 of the present embodiment 1, it stores the digital broadcast station data with a greater number of programs in the storage unit 22 (broadcasting station data list area 220) preferentially under any environment of the reception quality.

To be concrete, in the <Example 1> shown in FIG. 3, assuming that the maximum number of presets is 10 stations, as for the conventional example, the number of the analog broadcasting stations registered in the list is "8" and the number of the digital broadcast stations is "2" ("3" in terms of the multicasting programs). In contrast, in the present embodiment 1, the number of the analog broadcasting stations registered in the list is "2" and the number of the digital broadcast stations is "8" ("16" in terms of the multicasting programs). Thus, according to the <Example 1> shown in FIG. 3, the present embodiment 1 registers in the list the entry indicated by the frequency of "93.1 MHz", the RSSI of "51 dBuV", the digital broadcast "D", and the number of multicasting programs of "3" as the top priority broadcasting station data in the broadcasting station data list area 220 of the storage unit 22.

In addition, in the <Example 2> shown in FIG. 4, for example, although the number of the digital broadcast stations is conventionally "10" ("13" in terms of the number of multicasting programs) on the assumption that the maximum number of presets is 10, the number of the digital broadcast stations is "10" ("25" in terms of the number of multicasting programs)" in the present <Example 2>.

According to the HD radio receiver 10 of the present embodiment 1 described above, the control unit 21 decides the number of broadcast programs of the multicasting that broadcasts a plurality of programs on a single frequency from terrestrial digital radio broadcasts received, and registers in the storage unit 22 the broadcasting station data according to the number of decided broadcast programs of the multicasting in preference to broadcasting station data with better reception quality detected by the reception quality detecting unit 16, thereby being able to autostore a frequency with higher tone quality and with a greater number of programs preferentially as compared with a conventional example that makes a decision according to the reception quality. As a result, it can fulfill the original function of the HD radio receiver 10 and provide a user with convenience.

In addition, according to the HD radio receiver 10 of the present embodiment 1, the control unit 21 registers in the storage unit 22 the broadcasting station data with a greater number of broadcast programs of the multicasting in descending order of the reception quality detected by the reception quality detecting unit 16, and when the number of the broadcasting station data registered is less than the maximum number of registration to the storage unit 22, the remaining registration is carried out by registering the broadcasting station data in descending order of the reception quality including the analog broadcast as well, thereby being able to autostore well balanced broadcasting station data independent of an analog station or digital station while maintaining the compatibility, and to provide a user with further convenience.

Incidentally, as for the functions of the control unit 21 shown in FIG. 1, all of them can be realized by software, or at least part of them can be materialized by hardware.

For example, as for the data processing which decides the number of broadcast programs of the multicasting that broadcasts a plurality of programs on a single frequency from the terrestrial digital radio broadcasts received and which registers in the storage unit 22 the broadcasting station data with the greater number of decided broadcast programs in preference to the broadcasting station data with better reception quality detected by the reception quality detecting unit 16, it can be realized by one or more programs on a computer, or part thereof can be materialized by hardware.

In addition, as shown in FIG. 1, for example, an autostore control method of the present embodiment 1 is an autostore control method in an HD radio receiver that includes at least an operation unit 23, a control unit 21 and a storage unit 23, that monitors reception quality under the control of the control unit 21, that has an autostore function of automatically registering in the storage unit 22 broadcasting station data receivable by tuning, and that receives a hybrid terrestrial digital radio broadcast which transmits a digital signal simultaneously with an analog broadcast using an existing analog broadcast frequency, the autostore control method of the HD radio receiver comprising, as shown in FIG. 2, for example: a step (ST201) of carrying out tuning while the control unit successively alters the receiving frequency at a time when autostore is activated through the operation unit; a step (ST202 and ST203) of registering, when a radio broadcast received at each tuning has prescribed reception quality, the reception quality in the storage unit by the control unit; a step (ST204-ST208) of making, when the control unit makes a decision as to whether the radio broadcast received by the tuning includes a digital broadcast and when the digital broadcast is included, a further decision of a number of broadcast programs of multicasting that broadcasts a plurality of programs on a single frequency; and a step (ST210) of registering in the storage unit the broadcasting station data with a greater number of broadcast programs decided by the control unit in preference to the broadcasting station data with better reception quality.

According to the autostore control method relating to the present embodiment 1 described above, it has a step of deciding the number of broadcast programs of the multicasting that broadcasts a plurality of programs on a single frequency from terrestrial digital broadcasts received, and of registering the broadcasting station data with a greater number of the decided broadcast programs of the multicasting in preference to the broadcasting station data with better reception quality, thereby being able to autostore a frequency with higher tone quality and with greater number of programs preferentially. Accordingly, it can fulfill the original function of the HD radio receiver 10 and provide a user with convenience.

Industrial Applicability

An HD radio receiver and an autostore control method in accordance with the present invention can fulfill the original function of the HD radio receiver, and hence is suitable for applications for listening to or viewing a lot of programs with higher tone quality.

What is claimed is:

1. A hybrid digital (HD) radio receiver that uses an existing analog broadcast frequency and receives a hybrid terrestrial digital radio broadcast which transmits a digital signal simultaneously with an analog broadcast, the HD radio receiver comprising:

a storage unit for carrying out successive tuning of a plurality of candidate frequencies at a time when autostore is activated, and for storing broadcasting station data about a terrestrial digital radio broadcast received by the successive tuning;

a reception quality detecting unit for detecting reception quality of the radio broadcast received during the successive tuning; and a control unit for deciding a number of broadcast programs of multicasting that broadcasts a plurality of programs on a single frequency from the terrestrial digital radio broadcast received during the successive tuning, and for registering in the storage unit broadcasting station data with a greater number of decided broadcast programs with a preset station number in preference to broadcasting station data with better reception quality detected by the reception quality detecting unit.

2. A hybrid digital (HD) radio receiver that uses an existing analog broadcast frequency and receives a hybrid terrestrial digital radio broadcast which transmits a digital signal simultaneously with an analog broadcast, the HD radio receiver comprising:

a storage unit for carrying out tuning at a time when autostore is activated, and for storing broadcasting station date about a terrestrial digital radio broadcast received by the tuning;

a reception quality detecting unit for detecting reception quality of the radio broadcast received; and a control unit for deciding a number of broadcast programs of multicasting that broadcasts a plurality of programs on a single frequency from the terrestrial digital radio broadcast received, and for registering in the storage unit broadcasting station date with a greater number of decided broadcast programs in preference to broadcasting station data with better reception quality detected by the reception quality detecting unit, wherein the control unit registers in the storage unit the broadcasting station data with the greater number of broadcast programs of the multicasting in descending order of the reception quality detected by the reception quality detecting unit, and when the number of the registered broadcasting station data is less than a maximum number of registration in the storage unit, the broadcasting station data including the analog broadcast is registered in descending order of the reception quality as the remainder of the registration.

3. An autostore control method in a hybrid digital (HD) radio receiver that includes at least an operation unit, a control unit, and a storage unit, that monitors reception quality under control of the control unit, that has an autostore function of automatically registers receivable broadcasting station data in the storage unit by carrying out tuning, and that receives a hybrid terrestrial digital radio broadcast which transmits a digital signal simultaneously with an analog broadcast using an existing analog broadcast frequency, the autostore control method of the HD radio receiver comprising:

carrying out tuning while the control unit alters the receiving frequency successively at a time when autostore is activated through the operation unit;

registering, when a radio broadcast received during the successive tuning has prescribed reception quality, the reception quality in the storage unit by the control unit;

making a decision by the control unit, during the successive tuning, as to whether each radio broadcast received by the successive tuning includes a digital broadcast, and if the digital broadcast is included, making a further decision by the control unit of a number of broadcast programs of multicasting that broadcasts a plurality of programs on a single frequency; and registering in the storage unit the broadcasting station data with a greater number of broadcast programs decided by the control unit with a preset station number in preference to the broadcasting station data with better reception quality.

* * * * *